(12) United States Patent
Tamura

(10) Patent No.: US 7,770,191 B2
(45) Date of Patent: Aug. 3, 2010

(54) TRAY DOOR ATTACHMENT STRUCTURE FOR DISK DEVICE

(75) Inventor: Yohjiroh Tamura, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 677 days.

(21) Appl. No.: 11/723,175

(22) Filed: Mar. 16, 2007

(65) Prior Publication Data

US 2007/0220533 A1  Sep. 20, 2007

(30) Foreign Application Priority Data

Mar. 20, 2006  (JP) ............... 2006-075893

(51) Int. Cl.
*G11B 33/02* (2006.01)
(52) U.S. Cl. .................................... 720/647
(58) Field of Classification Search ................ 720/646, 720/647, 655
See application file for complete search history.

(56) References Cited

U.S. PATENT DOCUMENTS 7,495,712 B2 * 2/2009 Takeda .................. 348/836

2005/0257231 A1 * 11/2005 Hibi ..................... 720/647

FOREIGN PATENT DOCUMENTS

| JP | 2005-076691 | 3/2005 |
| JP | 2005-190551 | 7/2005 |
| JP | 2005327357 A * | 11/2005 |
| JP | 2006-004549 | 1/2006 |

* cited by examiner

*Primary Examiner*—Craig A. Renner
*Assistant Examiner*—Gustavo Polo
(74) *Attorney, Agent, or Firm*—Global IP Counselors, LLP

(57) ABSTRACT

A tray door attachment structure for a disk device has a tray door and a torsion coil spring. The tray door is pivotably attached to a front panel of the disk device. The tray door includes a door body, a door arm on which a spring receiving portion and a spring supporting portion located adjacent to the spring receiving portion are formed and a rotational axle formed on the door arm and attached to the front panel. The torsion coil spring biases the tray door in a closing direction. The torsion spring includes a coil attached to the rotational axle, a first arm abutting the front panel and a second arm abutting the spring receiving portion. The second arm has a distal end portion. The distal end portion is supported by the tray door and is latched by the spring supporting portion.

10 Claims, 9 Drawing Sheets

TRAY DOOR ATTACHMENT STRUCTURE FOR DISK DEVICE

CROSS-REFERENCE TO RELATED APPLICATIONS

This application claims priority to Japanese Patent Application No. 2006-075893 filed on Mar. 20, 2006. The entire disclosure of Japanese Patent Application No. 2006-075893 is hereby incorporated herein by reference.

BACKGROUND OF THE INVENTION

1. Field of the Invention

The present invention generally relates to a tray door attachment structure for a disk device. More specifically, the present invention relates to a tray door attachment structure for a disk device in which a torsion coil spring biases a tray door in a closing direction.

2. Background Information

A conventional example of a tray door attachment structure will be described through reference to FIGS. 11 and 12.

As shown in FIGS. 11 and 12, a tray door attachment structure 102 includes a tray door 103 and a torsion coil spring 108. The tray door 103 is attached to a front panel 112 of a disk device. The torsion coil spring 108 biases the tray door 103 to close a tray; opening 113 of the front panel 112.

The tray door 103 is equipped with a door body 104, a door arm 105 and a support shaft 106. The tray door 103 is integrally molded from a synthetic resin. The door body 104 is molded in the form of a relatively thin plate and is longer side to side. The door arm 105 has a right arm element 151 and a left arm element (not shown) formed on both lateral sides of the door body 104. The right arm element 151 is formed in a bow-shape, and leads to the door body 104 via the tray opening 113. On the right arm element 151, reinforcing ribs 153 and 154 are formed laterally outwardly along the inner and outer edges of the right arm element 151, and a protrusion 155 is formed continuously with the reinforcing rib 154. The support shaft 106 has a right shaft element 161 and a left shaft element (not shown) formed laterally outwardly on the right arm element 151 and the left arm element respectively.

The torsion coil spring 108 is provided between the front panel 112 and the tray door 103 to bias the tray door 103 in its closing direction. The torsion coil spring 108 has a coil 180 and first and second arms 181 and 182 that extend from the coil 180. The coil 180 is fitted to and supported by the right shaft element 161. The first arm 181 abuts a rear face 112a of the front panel 112, while the second arm 182 abuts an upper face 155a of the protrusion 155.

The tray door attachment structure 102 is attached to the front panel 112 by fitting the support shaft 106 to a bearing portion 107 formed on the front panel 112. The bearing portion 107 has a right bearing element 171 and a left bearing element (not shown) formed laterally apart from each other on the rear face 112a of the front panel 112. The right bearing element 171 and the left bearing element have shaft holes respectively. While the tray door attachment structure 102 is being attached to the front panel 112, the door body 104 is bent in a curved shape while the support shaft 106 is fitted to the shaft holes of the bearing portion 107. Then the door body 104 is returned to its initial shape.

Meanwhile, since the first and second arms 181 and 182 merely abut the rear face 112a and the upper face 155a, the torsion coil spring 108 will readily fall off of the support shaft 106 if the support shaft 106 should for some reason come out of the shaft holes of the bearing portion 107. Specifically, because the door body 104 is molded very thin and bends easily, it is conceivable that the support shaft 106 could come out of the shaft holes of the bearing portion 107 in the event of some stress or strain on the door body 104. If something like this should happen, the torsion coil spring 108 would fall off from the support shaft 106 and into the interior of the disk device, and in some cases this could short out the circuit of the wiring board and cause a malfunction.

In view of the above, it will be apparent to those skilled in the art from this disclosure that there exists a need for an improved tray door attachment structure. This invention addresses this need in the art as well as other needs, which will become apparent to those skilled in the art from this disclosure.

SUMMARY OF THE INVENTION

One object of the present invention is to provide a tray door attachment structure for a disk device which prevents a torsion coil spring from falling off.

In accordance with one aspect of the present invention, a tray door attachment structure for a disk device has a tray door and a torsion coil spring. The tray door is pivotably attached to a front panel of the disk device. The tray door includes a door body, a door arm on which a spring receiving portion and a spring supporting portion located adjacent to the spring receiving portion are formed and a rotational axle formed on the door arm and attached to the front panel. The torsion coil spring biases the tray door in a closing direction. The torsion spring includes a coil attached to the rotational axle, a first arm abutting the front panel and a second arm abutting the spring receiving portion. The second arm has a distal end portion. The distal end portion is supported by the tray door and is latched by the spring supporting portion.

With this constitution, since the distal end portion is supported by the tray door by being latched by the spring supporting portion, even if the tray door should become detached, the torsion coil spring will still be supported by the tray door. Therefore, the loss of the torsion coil spring inside the disk device is prevented. These and other objects, features, aspects and advantages of the present invention will become apparent to those skilled in the art from the following detailed description, which, taken in conjunction with the annexed drawings, discloses selected embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

The simplified configuration of a disk device 1 and a tray door attachment structure 2 for the disk device 1 will be described through reference to FIGS. 1 and 2.

Figure 1:
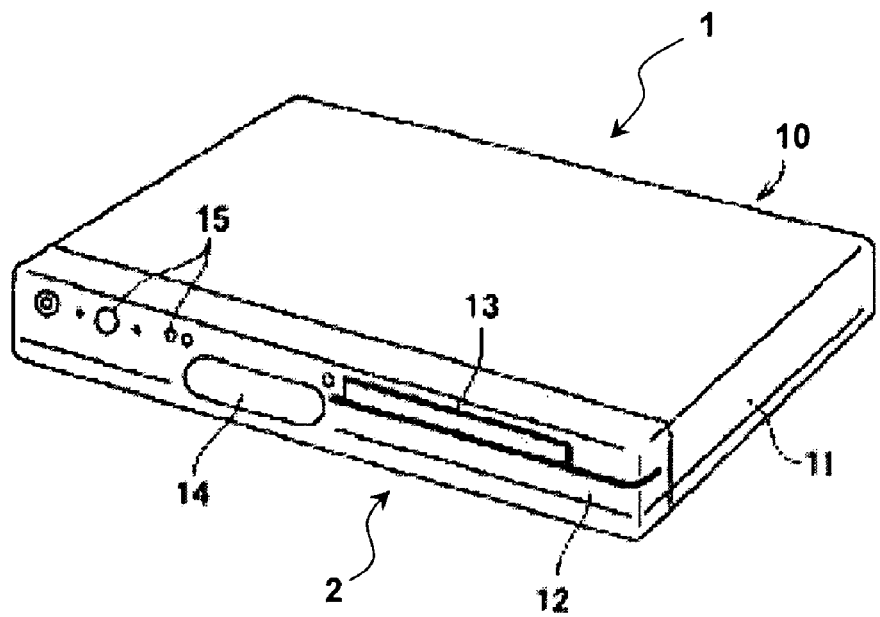
FIG. 1 is a diagram of the exterior of a disk device.

Referring to FIG. 1, the disk device 1 has a cabinet 10 and a disk loading mechanism (not shown) installed in the cabinet 10. The cabinet 10 is longer from side to side. The cabinet 10 has a cabinet body 11, a front panel 12 and a tray door attachment structure 2. The cabinet body 11 has an opening at its front end. The front panel 12 is attached to the front end of the cabinet body 11. The tray door attachment structure 2 is attached to the front panel 12. The front panel 12 has a bearing portion 7 formed on the rear side thereof (see FIG. 2). On the front panel 12, a tray opening 13, a display window 14 and openings 15 are formed. The tray opening 13 is opened and closed by the tray door attachment structure 2. Through the tray opening 13, a tray of the disk loading mechanism moves in and out. In the display window 14, a setting mode and so forth are displayed. In the openings 15, various control buttons and so forth are installed.

Figure 2:
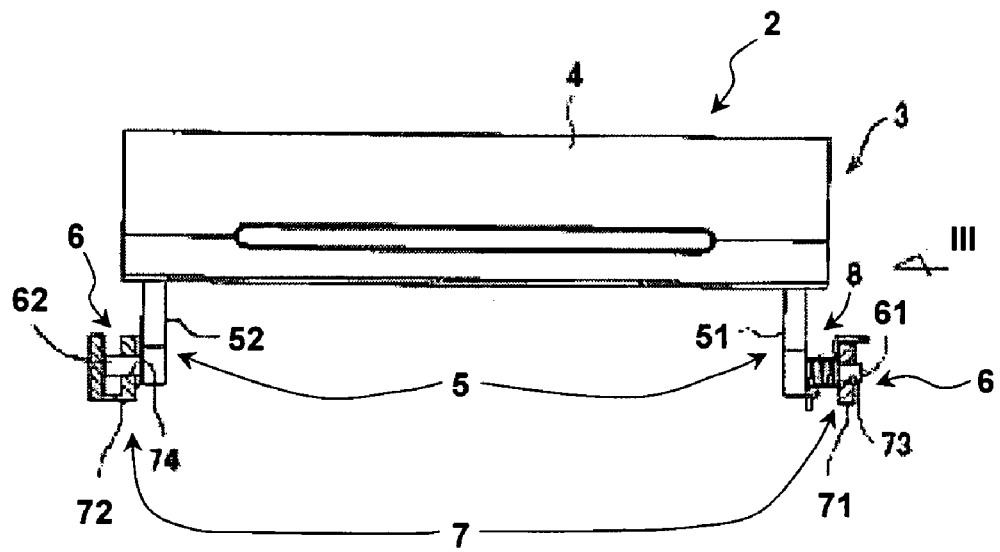
FIG. 2 is a front view of a tray door.

As shown in FIG. 2, the tray door attachment structure 2 includes a tray door 3 and a torsion coil spring 8. The tray door 3 is attached to the front panel 12 of the disk device 1. The torsion coil spring 8 biases the tray door 3 to close the tray opening 13 of the front panel 12.

More specifically, the tray door 3 is equipped with a door body 4, a door arm 5 and a support shaft (or a rotational axle) 6. The tray door 3 is integrally molded from a synthetic resin. The door body 4 is molded in the form of a relatively thin plate and is longer side to side. The size and shape of the door body 4 are determined by those of the tray opening 13. The door arm 5 is formed on the rear side of the door body 4. The door arm 5 has a right arm element 51 and a left arm element 52 formed on both lateral sides of the door body 4.

The support shaft 6 has a right shaft element 61 and a left shaft element 62 formed laterally outwardly on the right arm element 51 and the left arm element 52 respectively. The support shaft 6 is fitted to the bearing portion 7 formed on the front panel 12.

The bearing portion 7 has a right bearing element 71 and a left bearing element 72 formed on a rear face 12a (see FIG. 3) of the front panel 12 laterally apart from each other. The right bearing element 71 and the left bearing element 72 have shaft holes 73 and 74, respectively. When the tray door attachment structure 2 is attached to the front panel 12, the door body 4 is bent in a curved shape while the right and left shaft elements 61 and 62 are fitted to the shaft holes 73 and 74 respectively. Then, the door body 104 is returned to its initial shape.

Figure 3:
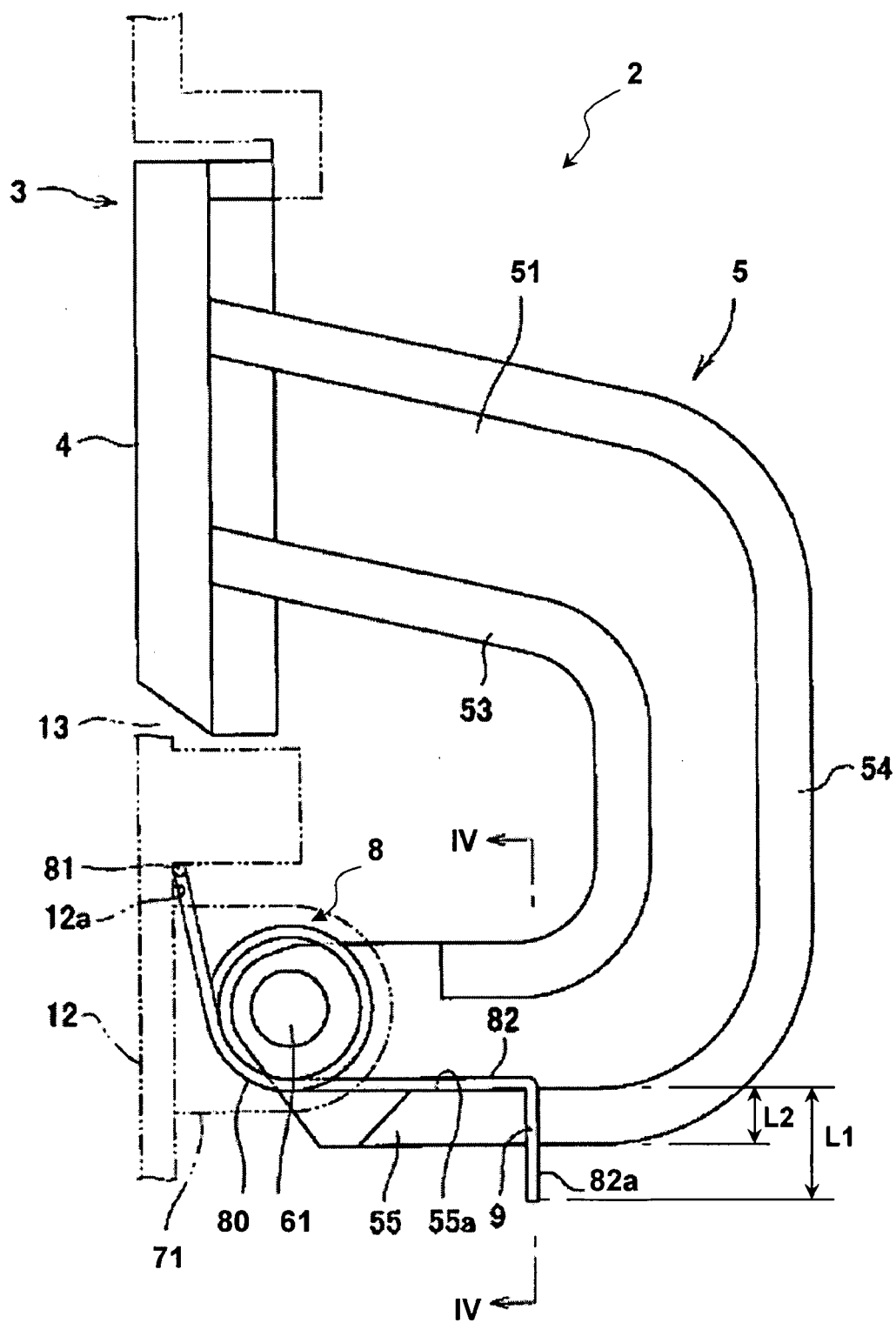
FIG. 3 is a detail side view of a tray door attachment structure as seen in the direction of the III arrow in FIG. 2.

The torsion coil spring 8 is provided between the front panel 12 and the tray door 3 to bias the tray door 3 in its closing direction. Specifically, the torsion coil spring 8 is fitted to and supported by the right shaft element 61 and is latched by the right arm element 51. Moreover, the torsion coil spring 8 is laterally disposed between the right arm element 51 and the right bearing element 71. As shown in FIG. 3, the torsion coil spring 8 has a coil 80 and first and second arms 81 and 82 extending from the coil 80. The coil 80 is fitted to and supported by the right shaft element 61. The first arm 81 abuts the rear face 12a of the front panel 12 and the second arm 82 abuts an upper face (or a spring receiving portion) 55a of a protrusion 55. On a distal end of the second arm 82, a distal end portion 82a is formed by bending the second arm 82 at a right angle.

Referring to FIGS. 3 to 6, the details of the door arm 5 and the torsion coil spring 8 will be described. As shown in FIG. 3, the right arm element 51 is formed in a bow-shape, and is configured to lead to the door body 4 via the tray opening 13. On the right arm element 51, reinforcing ribs 53 and 54, a protrusion 55 and cut-out (or spring supporting portion) 9 are formed. The reinforcing ribs 53 and 54 are formed laterally outwardly along the inner and outer edges, respectively, of the right arm element 51. The protrusion 55 is formed apart from the reinforcing rib 54 and is configured to protrude laterally outwardly from the right arm element 51. The cut-out 9 is formed between the reinforcing rib 54 and the protrusion 55 by cutting out a portion of the reinforcing rib 54. The cut-out 9 is configured to latch the distal end portion 82a of the torsion coil spring 8. The distal end portion 82a is press-fitted into the cut-out 9. The cut-out 9 may be formed at the same time that the tray door 3 is integrally molded from a synthetic resin.

Figure 4:
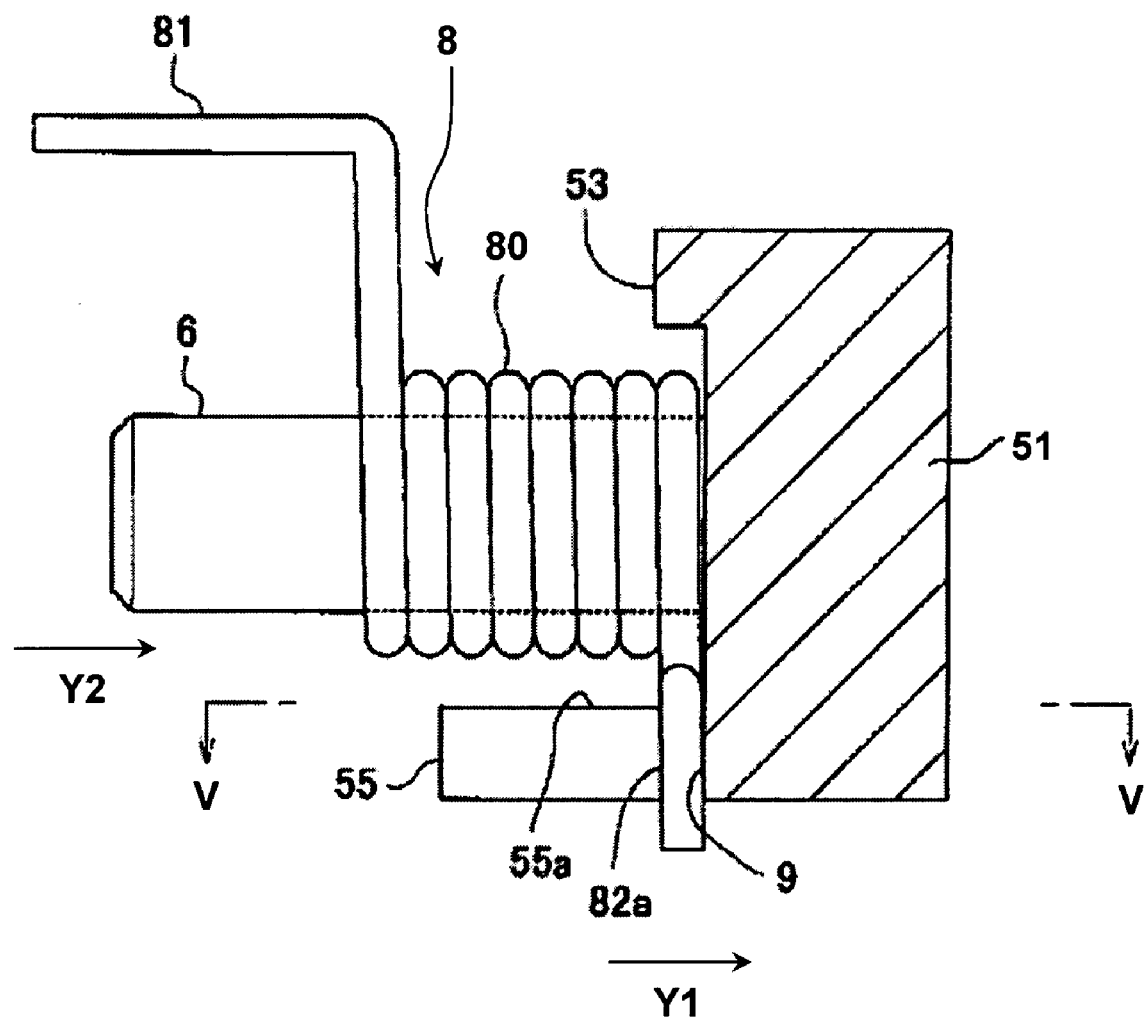
FIG. 4 is a detail cross section of the portion along the IV-IV line in FIG. 3.
Figure 5:
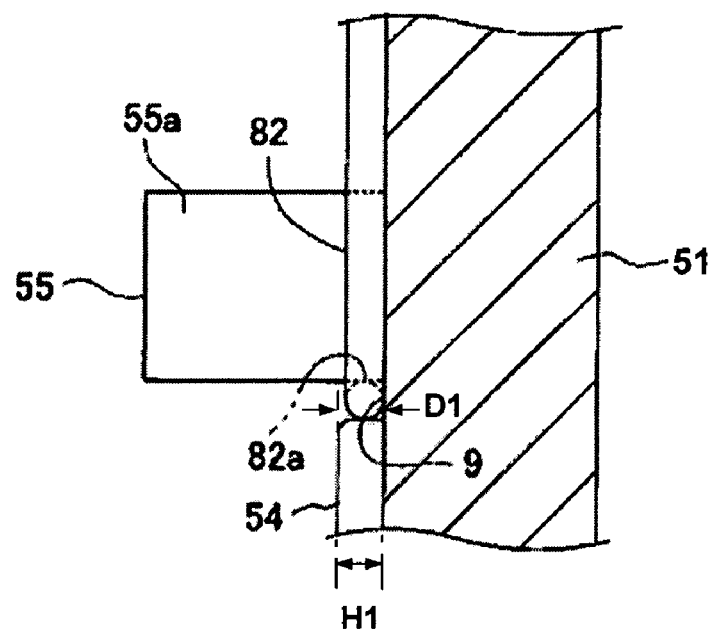
FIG. 5 is a cross section of the portion along the V-V line in FIG. 4.
Figure 6:
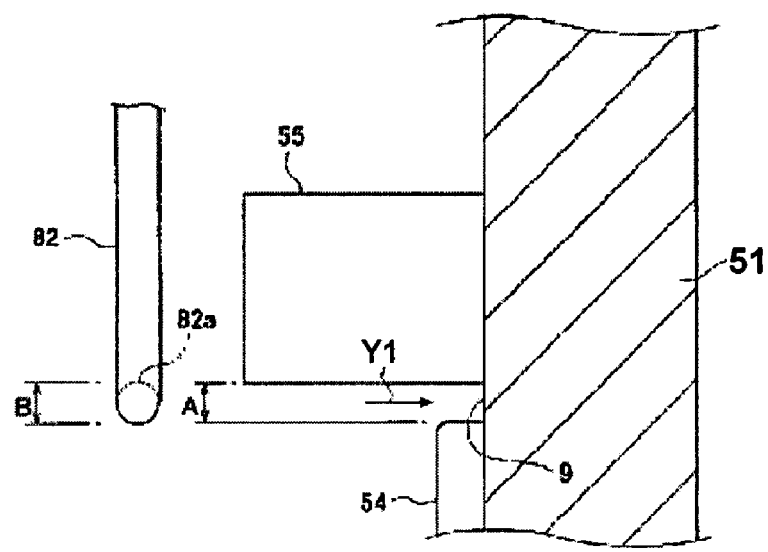
FIG. 6 is a diagram of the assembly process.

The length L1 of the distal end portion 82a is greater than the thickness L2 of the reinforcing rib 54, as shown in FIG. 3. The depth direction Y1 of the cut-out 9 coincides with the axial direction Y2 of the support shaft 6 as shown in FIG. 4. The depth D1 of the cut-out 9 is the same dimension as the height H1 of the reinforcing rib 54 as shown in FIG. 5. Thus, the distal end portion 82a, which is press-fitted into the cut-out 9, abuts the right arm element 51. Furthermore, as shown in FIG. 6, a gap size (or width) A of the cut-out 9 is slightly smaller than the diameter B of the distal end portion 82a.

Accordingly, as can be seen by viewing FIGS. 4 and 6 together, the assembly process of the tray door attachment structure 2 is as follows. When the step of fitting the coil 80 of the torsion coil spring 8 to the support shaft 6 is performed, the distal end portion 82a is grasped with a pair of tweezers or the like, and at the same time the second arm 82 is lifted onto the protrusion 55. Then, the torsion coil spring 8 moves in the depth direction (arrow Y1) of the cut-out 9, and the distal end portion 82a is press-fitted into the cut-out 9. The assembly process of the tray door attachment structure 2 is no more trouble than with the conventional tray door attachment structure 102, so mass production tends to be unaffected.

Furthermore, with the constitution described above, since the torsion coil spring 8 is press-fitted into the cut-out 9 formed on the tray door 3 and is supported by the tray door 3, even if the tray door 3 should become detached, the torsion coil spring 8 will still be supported by the tray door 3. Therefore, the loss of the torsion coil spring 8 inside the disk device 1 and causing damage is effectively prevented. Also, there is no need for additional parts or complex bending of the torsion coil spring 8 to prevent the torsion coil spring 8 from falling off.

Second Embodiment

Referring now to FIGS. 7 to 10, a tray door attachment structure in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a double prime (").

Figure 7:
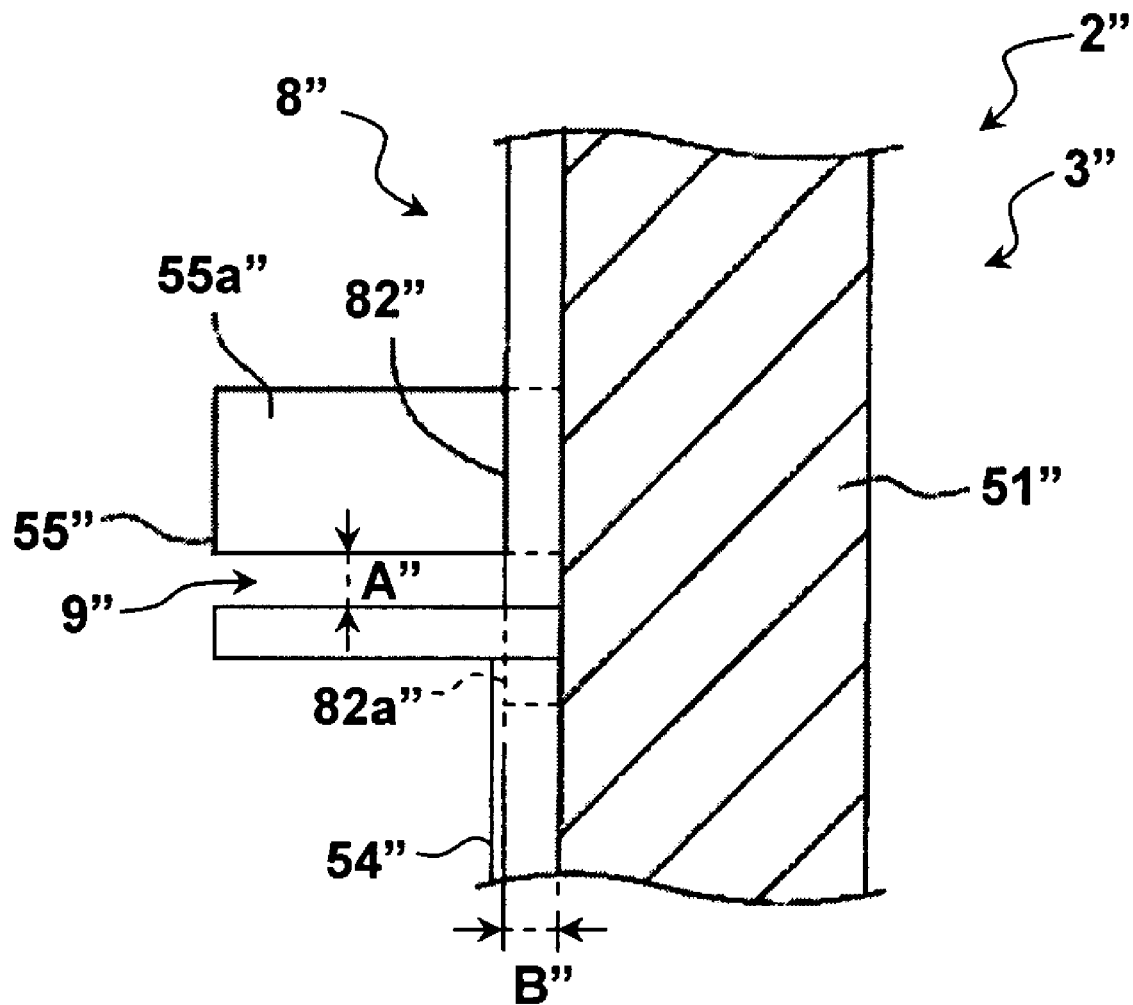
FIG. 7 is a cross section of a tray door attachment structure in accordance with a second embodiment.
Figure 8:
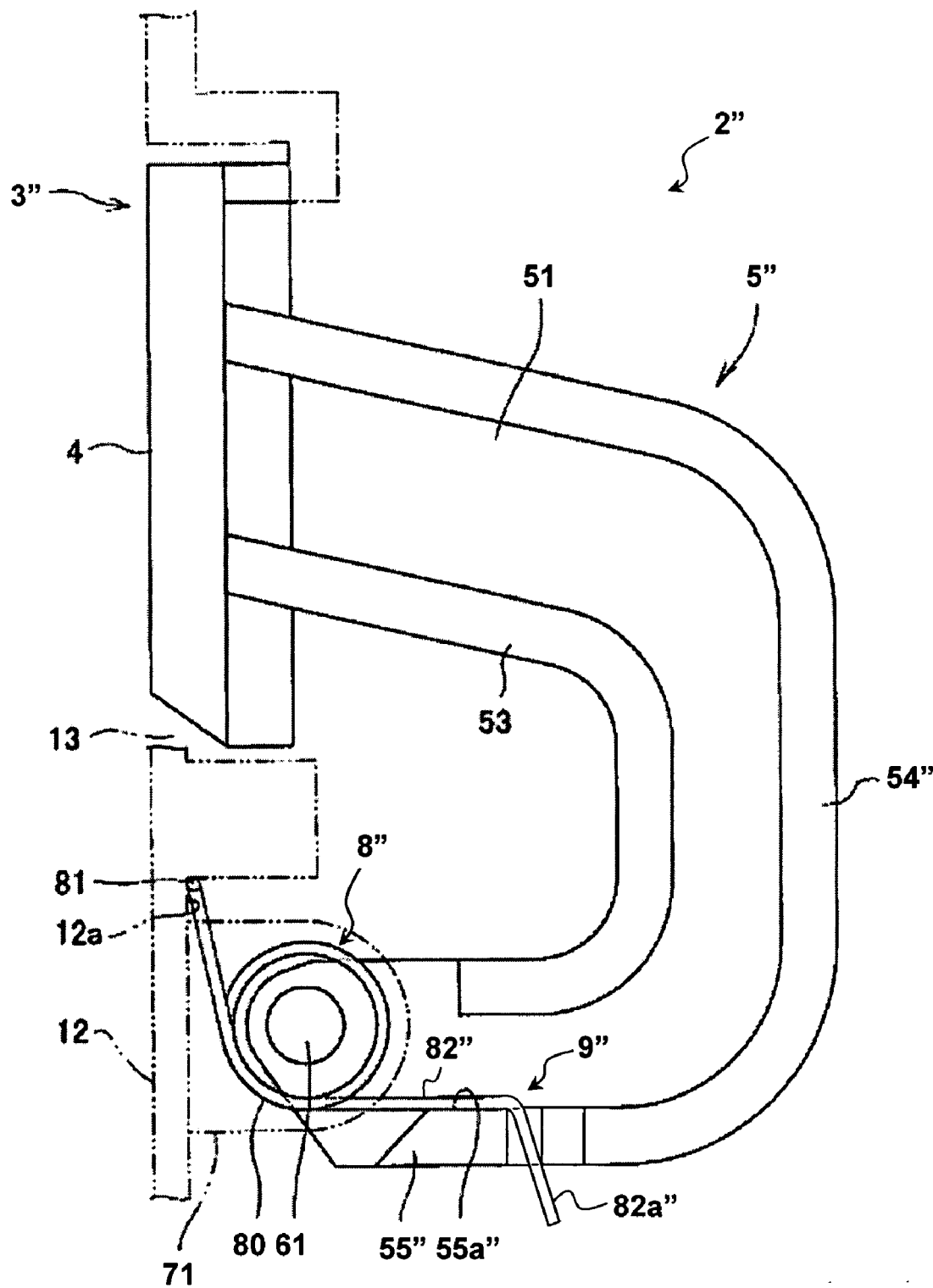
FIG. 8 is a detail side view of a tray door attachment structure in accordance with a second embodiment.

In the above embodiment, the cut-out 9 was formed at the base of the reinforcing rib 54. However, the location of the cut-out is not limited to this. For example, as shown in FIGS. 7 and 8, a cut-out 9" may be formed on a protrusion 55" of a door arm 5". The gap size A" of the cut-out 9" is greater than the diameter B" of a distal end portion 82a" of a torsion coil spring 8". The distal end portion 82a" extends straight from a second arm 82" of the torsion coil spring 8" before the torsion coil spring 8" is attached to a tray door 3". When the torsion coil spring 8" is attached to the tray door 3", the distal end portion 82a" is inserted into the cut-out 9" and is bent so that the distal end portion 82a" is latched in the cut-out 9" with its restoring force.

Figure 9:
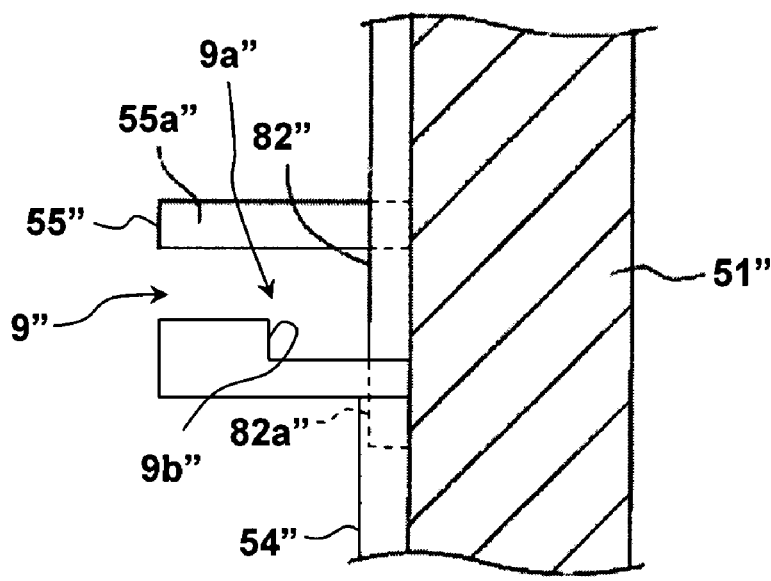
FIG. 9 is a cross section of a tray door attachment structure in accordance with a second embodiment.
Figure 10:
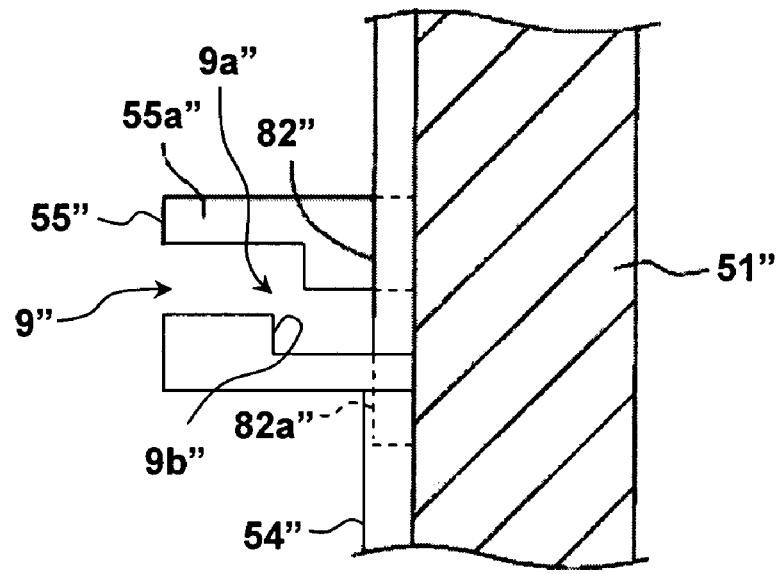
FIG. 10 is a cross section of a tray door attachment structure in accordance with a second embodiment.
Figure 11:
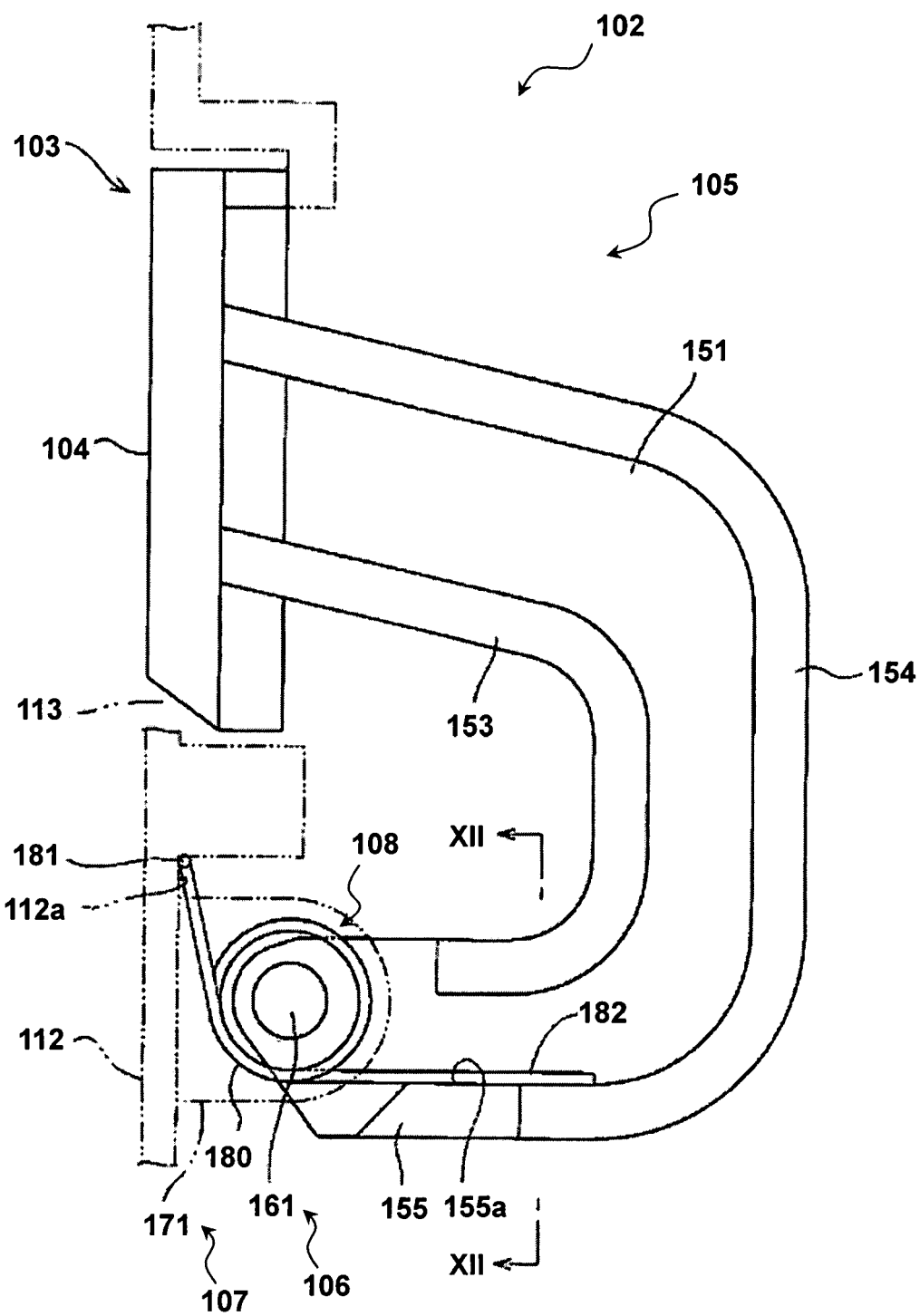
FIG. 11 is a detail side view of a conventional tray door attachment structure.
Figure 12:
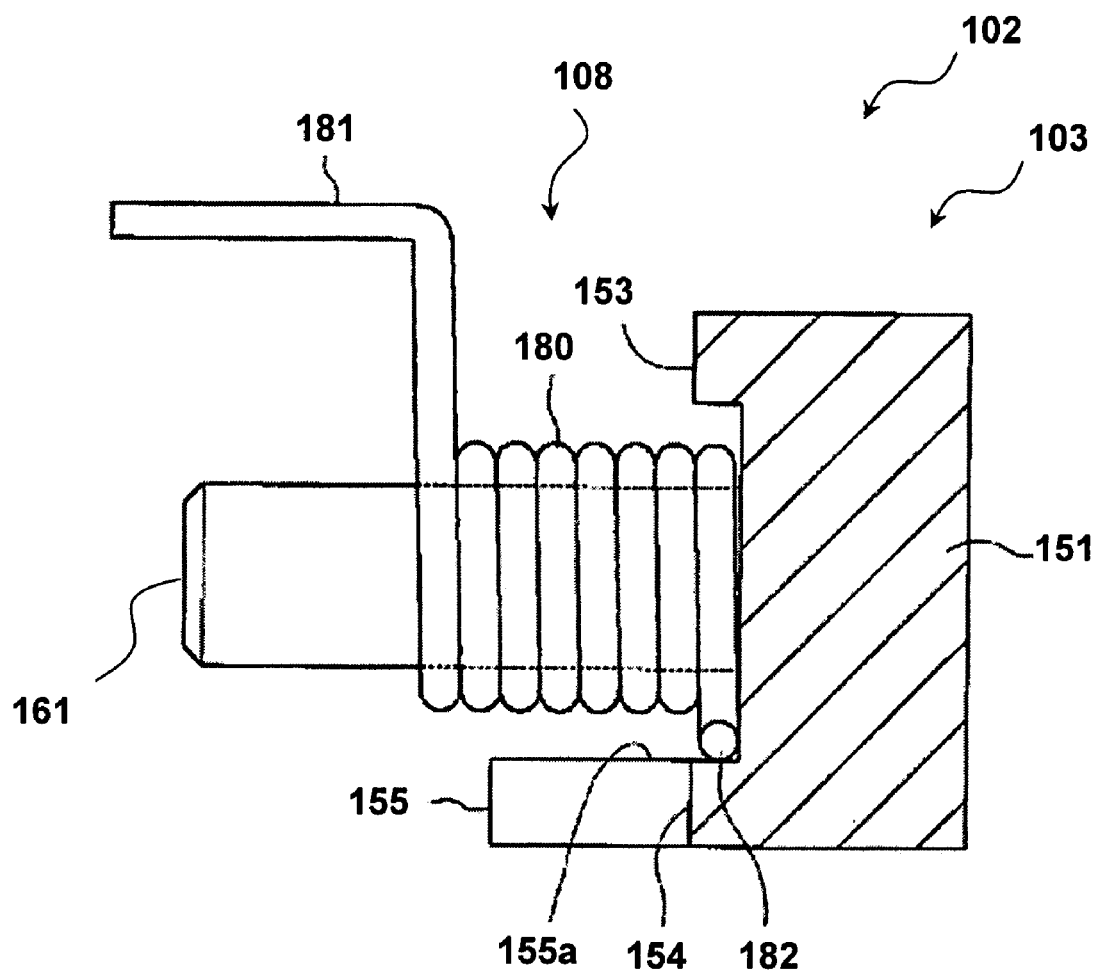
FIG. 12 is a cross section of the portion along the XII-XII line in FIG. 11.

Furthermore, the shape of the cut-out 9" is not limited. For example, as shown in FIG. 9 or 10, the shape of the cut-out 9" may include an engaging portion 9a" having an engaging face 9b" facing inwardly to a right arm element 51". With this arrangement, even if the torsion coil spring 8" moves laterally outwardly, the distal end portion 82a" is engaged by the engaging portion 9a", which prevents the torsion coil spring 8" from falling off.

General Interpretation of Terms

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a disk device equipped with the present invention. Accordingly, these terms, as utilized to describe the present invention should be interpreted relative to a disk device equipped with the present invention as used in the normal position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A tray door attachment structure for a disk device comprising:
   a tray door pivotally attached to a front panel of the disk device, the tray door including
      a door body,
      a door arm on which a spring receiving portion and a spring supporting portion located adjacent to the spring receiving portion are formed with the spring supporting portion including first and second contact portions with a gap therebetween, and
      a rotational axle formed on the door arm and attached to the front panel; and
   a torsion coil spring configured to bias the tray door in a closing direction, the torsion coil spring including
      a coil attached to the rotational axle,
      a first arm extending from the coil and abutting the front panel, and
      a second arm extending from the coil and abutting the spring receiving portion,
   the second arm of the torsion coil spring having a distal end portion that is engaged to the door arm and is latched by the spring supporting portion, the distal end portion of the second arm being disposed through the gap of the spring supporting portion such that the distal end portion of the second arm contacts with the first and second contact portions of the spring supporting portion.

2. The tray door attachment structure for a disk device according to claim 1, wherein
   the distal end portion is latched by the spring supporting portion by being press-fitted into the gap of the spring supporting portion.

3. The tray door attachment structure for a disk device according to claim 1, wherein
   the spring supporting portion includes a cut-out, which corresponds to the gap of the spring supporting portion, the cut-out being formed adjacent to the spring receiving portion.

4. A tray door attachment structure for a disk device comprising:
   a tray door pivotally attached to a front panel of the disk device, the tray door including
      a door body,
      a door arm on which a spring receiving portion and a spring supporting portion located adjacent to the spring receiving portion are formed, and
      a rotational axle formed on the door arm and attached to the front panel; and
   a torsion coil spring configured to bias the tray door in a closing direction, the torsion coil spring including
      a coil attached to the rotational axle,
      a first arm extending from the coil and abutting the front panel, and
      a second arm extending from the coil and abutting the spring receiving portion,
   the second arm having a distal end portion that is engaged to the door arm and is latched by the spring supporting portion,
   the door arm further including a flat bow-shaped door arm element attached to the door body, a reinforcing rib formed on an edge of the door arm element and a protrusion protruding from the door arm element,
   the spring receiving portion being provided to an upper face of the protrusion, and
   the spring supporting portion being provided between the reinforcing rib and the protrusion.

5. The tray door attachment structure for a disk device according to claim 4, wherein
the spring supporting portion is formed by cutting out the reinforcing rib.

6. The tray door attachment structure for a disk device according to claim 1, wherein
the distal end portion is formed by bending the second arm and is press-fitted into the gap of the spring supporting portion.

7. The tray door attachment structure for a disk device according to claim 6, wherein
the distal end portion is formed by bending the second arm at a substantially right angle.

8. The tray door attachment structure for a disk device according to claim 1, wherein
a width of the gap of the spring supporting portion is smaller than a diameter of the distal end portion.

9. The tray door attachment structure for a disk device according to claim 1, wherein
the gap of the spring supporting portion is formed in a direction along the rotational axle.

10. The tray door attachment structure for a disk device according to claim 4, wherein
a length of the distal end portion is greater than a thickness of the reinforcing rib.

* * * * *